(12) United States Patent
Cheng et al.

(10) Patent No.: US 9,918,010 B2
(45) Date of Patent: Mar. 13, 2018

(54) METHOD FOR ADJUSTING VEHICLE PANORAMA SYSTEM

(71) Applicant: INDUSTRIAL TECHNOLOGY RESEARCH INSTITUTE, Hsin-Chu (TW)

(72) Inventors: Pai-Wei Cheng, Taipei (TW); Long-Tai Chen, Miaoli (TW); Po-Feng Chang, Hsin-Chu (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 317 days.

(21) Appl. No.: 14/977,793

(22) Filed: Dec. 22, 2015

(65) Prior Publication Data

US 2017/0006221 A1    Jan. 5, 2017

(30) Foreign Application Priority Data

Jun. 30, 2015    (TW) .............................. 104121173 A

(51) Int. Cl.
*H04N 7/00* (2011.01)
*H04N 5/232* (2006.01)
*H04N 17/00* (2006.01)
*G06K 9/00* (2006.01)
*G06T 5/50* (2006.01)
(Continued)

(52) U.S. Cl.
CPC ........... *H04N 5/23238* (2013.01); *B60R 1/00* (2013.01); *G06K 9/00791* (2013.01); *G06T 5/50* (2013.01); *G06T 7/33* (2017.01); *H04N 5/247* (2013.01); *H04N 17/002* (2013.01); *B60R 2300/105* (2013.01); *B60R 2300/402* (2013.01); *G06T 2207/30252* (2013.01)

(58) Field of Classification Search
CPC .................................................. H04N 5/23238
USPC ........................................................... 348/38
See application file for complete search history.

(56) References Cited

U.S. PATENT DOCUMENTS 8,368,761 B2    2/2013    Chung
8,520,084 B2    8/2013    Tsai et al.
(Continued)

FOREIGN PATENT DOCUMENTS

CN    1174623 C    11/2004
CN    1985266 A    6/2007
(Continued)

OTHER PUBLICATIONS

State Intellectual Property Office of the P.R.C., "Office Action", dated Aug. 21, 2017, China.
(Continued)

*Primary Examiner* — Richard Torrente
(74) *Attorney, Agent, or Firm* — Locke Lord LLP; Tim Tingkang Xia, Esq.

(57) ABSTRACT

A method for adjusting vehicle panorama system, which comprises: a calibration pattern is disposed around a vehicle, and at least one patterned feature and a plurality of cameras are disposed on the vehicle; capture the calibration pattern and patterned feature to obtain an original image; capture the patterned feature after a period of time to obtain a correction image; compares the correction image and original image and corrects the panorama images by recombining the images shoot by the plurality of cameras according to a comparison result.

10 Claims, 4 Drawing Sheets

(51) Int. Cl.
  *B60R 1/00* (2006.01)
  *H04N 5/247* (2006.01)
  *G06T 7/33* (2017.01)

(56) References Cited

U.S. PATENT DOCUMENTS

| | | |
|---|---|---|
| 8,891,625 B2 | 11/2014 | Chen et al. |
| 2008/0002023 A1 | 1/2008 | Cutler |
| 2008/0044061 A1 | 2/2008 | Hongo |
| 2010/0194886 A1 | 8/2010 | Asari et al. |
| 2012/0002057 A1 | 1/2012 | Kakinami |
| 2012/0154604 A1 | 6/2012 | Chen et al. |
| 2012/0320190 A1 | 12/2012 | Natroshvili et al. |
| 2014/0085469 A1 | 3/2014 | Sakano et al. |
| 2014/0098229 A1* | 4/2014 | Lu .................. H04N 7/181 348/148 |
| 2014/0184814 A1 | 7/2014 | Lin et al. |
| 2015/0029338 A1 | 1/2015 | Lee et al. |
| 2017/0309042 A1* | 10/2017 | Tanaka .................. G06T 7/80 |

FOREIGN PATENT DOCUMENTS

| | | |
|---|---|---|
| CN | 102629372 A | 8/2012 |
| CN | 103024428 A | 4/2013 |
| CN | 103035005 A | 4/2013 |
| CN | 103530626 A | 1/2014 |
| CN | 103763517 A | 4/2014 |
| CN | 103895573 A | 7/2014 |
| TW | 201226237 A | 7/2012 |
| TW | I392366 B | 4/2013 |
| TW | I401612 B | 7/2013 |
| TW | I417639 B | 12/2013 |
| TW | I465105 B | 12/2014 |
| TW | I470213 B | 1/2015 |

OTHER PUBLICATIONS

Intellectual Property Office, Ministry of Economic Affairs, R. O. C, "Office Action", dated Dec. 15, 2015, Taiwan.
Byeongchan Jeon et al., A Memory-Efficient Architecture of Full HD Around View Monitor Systems, IEEE Transactions on Intelligent Transportation Systems, 2014,15, 6, 2683-2695.
Ruzhong Cheng et al., A practical Panorama Parking Assistant System based on image splicing, 8th International Conference on Information Science and Digital Content Technology (ICIDT), 2012, vol. 2, 444-448.
Hermans, C. et al., Extrinsic Recalibration in Camera Networks, Fourth Canadian Conference on Computer and Robot Vision, 2007, 3-10.
Yingen Xiong et al., Fast and High-Quality Image Blending on Mobile Phones, IEEE, 2010, 1-5.
Yingen Xiong et al., Fast panorama stitching for high-quality panoramic images on mobile phones, IEEE Transactions on Consumer Electronics, 2010, vol. 56, Issue: 2, 298-306.
Yingen Xiong et al., Fast panorama stitching on mobile devices, 2010 Digest of Technical Papers International Conference on Consumer Electronics (ICCE), IEEE, 2010, 319-320.
Doutre, C. et al., Fast Vignetting Correction and Color Matching for Panoramic Image Stitching, 6th IEEE International Conference on Image Processing (ICIP), 2009, 709-712.
Huang, Gaopan et al., Self-Recalibration of PTZ Cameras, 2010 International Conference on Machine Vision and Human-Machine Interface, 2010, 292-295.

\* cited by examiner

METHOD FOR ADJUSTING VEHICLE PANORAMA SYSTEM

CROSS REFERENCE TO RELATED APPLICATION

This application also claims priority to Taiwan Patent Application No. 104121173 filed in the Taiwan Patent Office on Jun. 30, 2015, the entire content of which is incorporated herein by reference.

TECHNICAL FIELD

The present disclosure relates to a vehicle panorama system adjusting method, and more particularly, to a method for adjusting a vehicle panorama system capable of rapidly adjusting a panorama image surrounding a vehicle according the displacement of at least one patterned feature disposed on the vehicle when cameras on the vehicle for capturing the panorama image are displaced.

BACKGROUND

For improving driving safety and comfort, most vehicles available today had already equipped with some sort of panorama system. Moreover, by the use of the panorama system, any driver driving a vehicle is able to monitor environment surrounding the vehicle at all time for collision prevention.

A conventional panorama system is structured and operated basing upon a plurality of cameras mounted on a vehicle for capturing images of the environment surrounding the vehicle, and then stitching the plural images into a 360-degree around view image of the vehicle. Generally, in a condition when a panorama system is first being initiated or when any of the cameras of a panorama system is displaced, it is required to place several calibration panels surrounding the vehicle using the panorama system for calibrating the so-generated 360-degree image. Consequently, not only the placing of such calibration panels can be a very time-consuming task, but also there are site constraints existed for placing and setting the calibration panels.

Therefore, it is required to have a method for adjusting a vehicle panorama system that can be performed rapidly and conveniently.

SUMMARY

In an embodiment, the present invention provides a method for adjusting a vehicle panorama system, comprising the steps of:

disposing a calibration pattern around a vehicle, while providing at least one patterned feature and a plurality of cameras to be disposed on the vehicle;

capturing the calibration pattern and at least one patterned feature so as to obtain an original image;

capturing the at least one patterned feature and registering the captured patterned feature into a memory after a period of time so as to obtain a correction image; and comparing the correction image with original image for generating a comparison result to be used in a panorama image calibration process by recombining the images shoot by the plural cameras.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
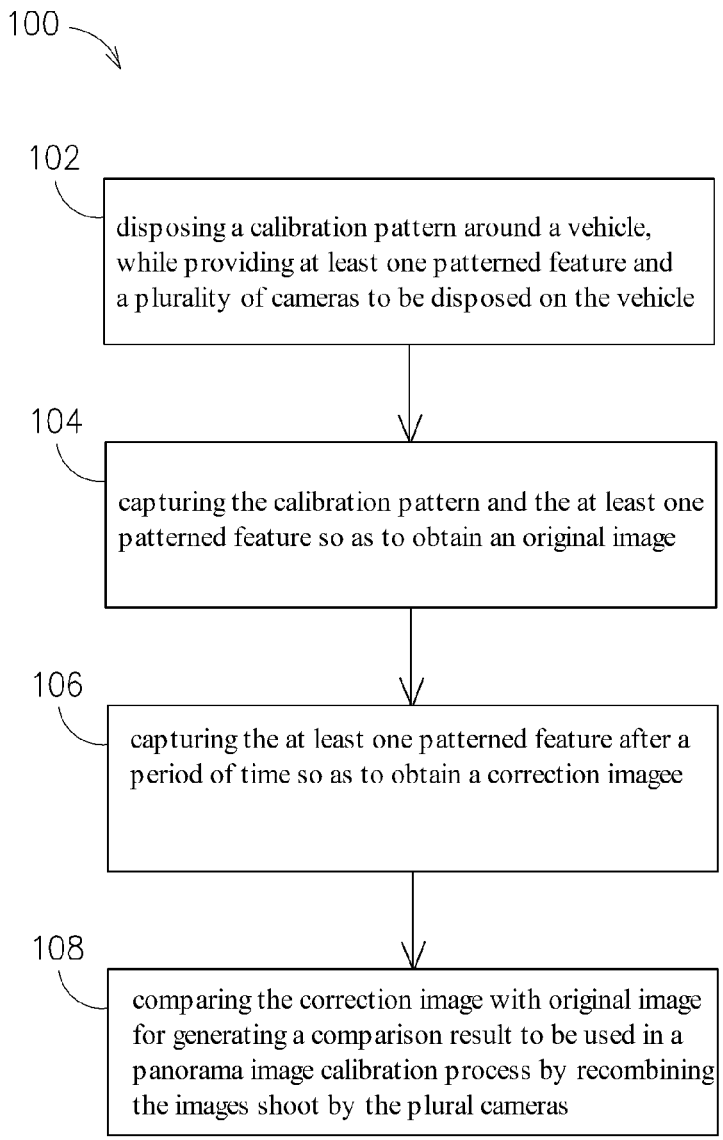
FIG. 1 is a flow chart depicting steps performed in a method for adjusting a vehicle panorama system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
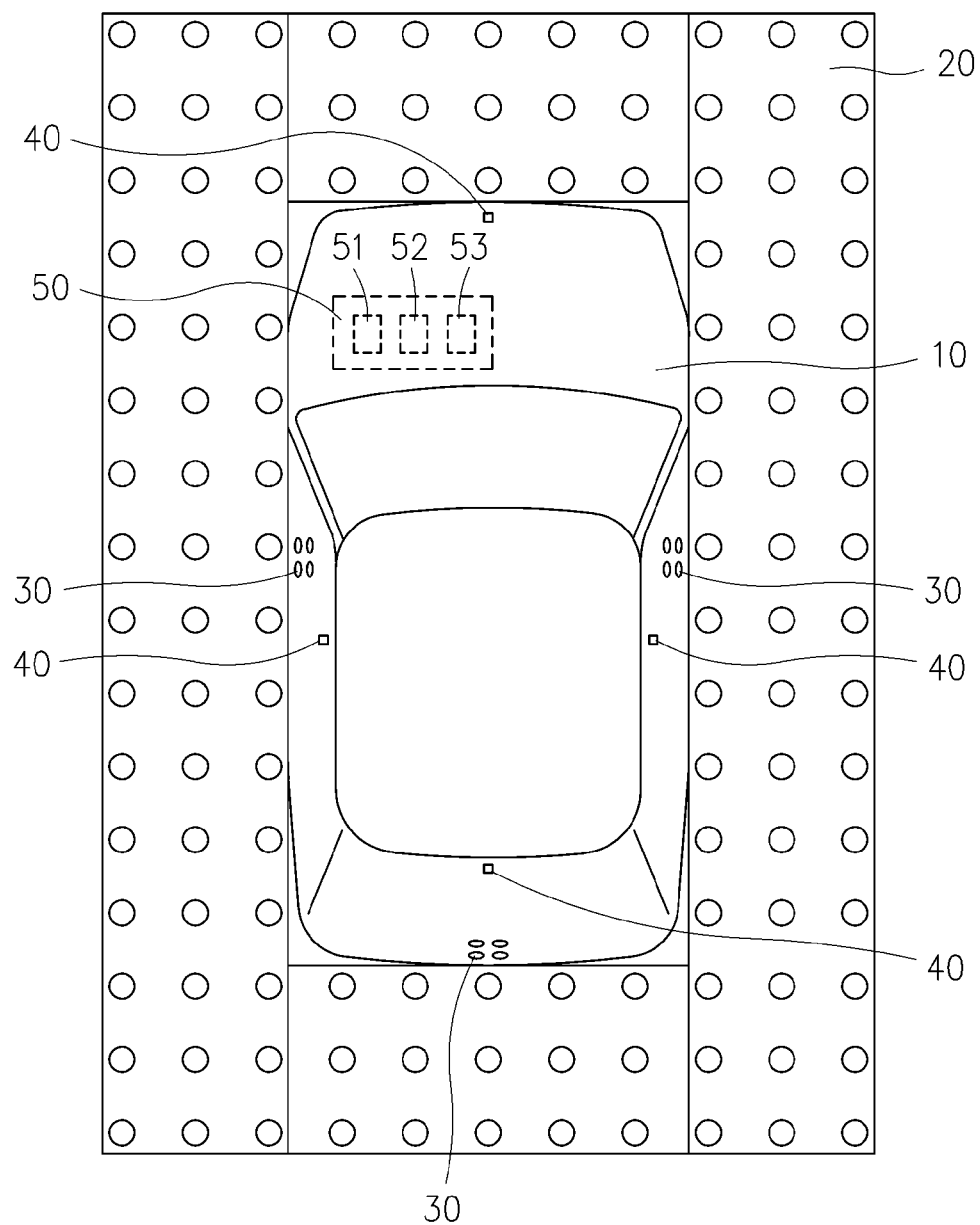
FIG. 2 is a schematic diagram showing the placing of a calibration pattern, four patterned features and a plurality of cameras on a vehicle according to an embodiment of the present disclosure.

Please refer to FIG. 1 and FIG. 2, which are respectively a flow chart depicting steps performed in a method for adjusting a vehicle panorama system according to an embodiment of the present disclosure and a schematic diagram showing the placing of a calibration pattern, four patterned features and a plurality of cameras on a vehicle according to an embodiment of the present disclosure. As shown in FIG. 1, the method 100 comprising the step 104 to step 108.

In step 102, a calibration pattern is disposed around a vehicle 10, while providing at least one patterned feature and a plurality of cameras 40 to be disposed on the vehicle 10.

It is noted that there can be a plurality of patterned features 20 disposed on the periphery of the vehicle 10, while allowing each patterned feature 20 to be composed of at least two raws of dots 21 or at least two lines of dots 21. In an embodiment shown in FIG. 2, there are four patterned features 30 to be disposed respectively on the four sides of the vehicle 10 (the pattern feature in the front of the vehicle 10 is not shown in FIG. 2). There can be a plurality of cameras 40 mounted on the vehicle 10. It is noted that there is no limitation relating to the type, the formation and the disposition of the patterned feature 30, so that the patterned feature 30 can be a feature selected from the group consisting of: a vehicle sticker, an infrared pattern, a laser pattern, and a fluorescent pattern. In this embodiment, the calibration pattern 20 can be an array of dots 21, but is not limited thereby, while each of the patterned feature 30 can be an array of four smaller dots 21 and each of the dot 21 is formed with a diameter ranged between 2~30 cm while enabling the cenyters of amy two neighboring dots 21 in the array to be spaced from each other by 2~30 cm, but is also not limited thereby in shape and amount. However, it is required to place each patterned feature 30 at any location only if it can be captured clearly by the cameras 40, without interfering with calibration pattern 20. Generally, there should be at least one camera 40 to be disposed respectively at four sides of the vehicle 10 so that the front, rear, left and right of the vehicle 10 can be monitored, while allowing the images captured respectively from those cameras 40 to be combined into a 360-degree around view image of the vehicle.

In addition, the vehicle 10 has an embedded device 50, which comprises: an image processing interface 50, a computing core 52 and a memory unit 53. The embedded device 50 is electrically connected to the cameras 40, and is used for performing processes and information used in the method for adjusting a vehicle panorama system of the present disclosure. It is noted that the embedded device 50 can be mounted at any location on the vehicle 10 that is not limited by the embodiment shown in FIG. 2.

At step 104, the calibration pattern and the patterned features are captured so as to obtain an original image.

Figure 3:
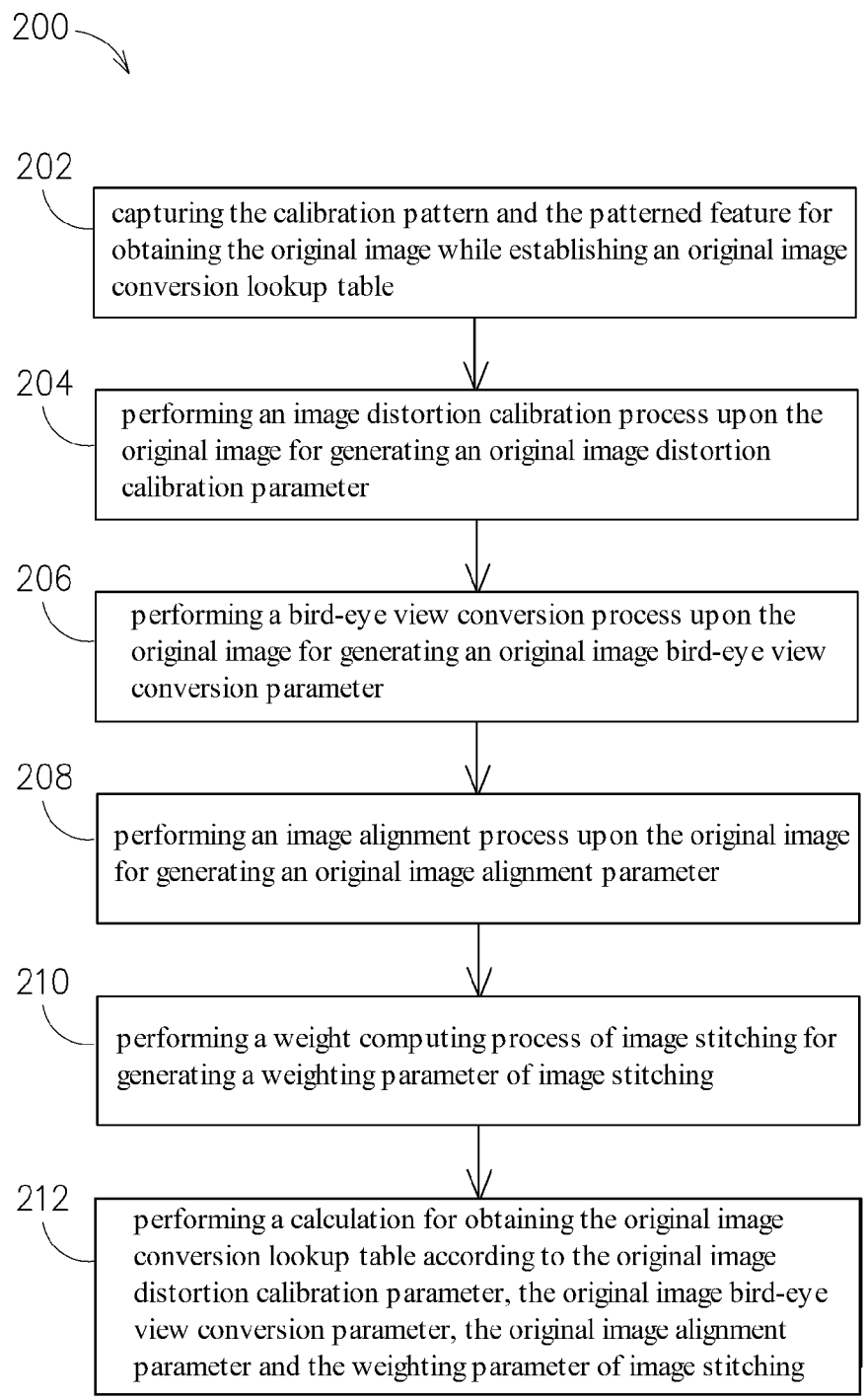
FIG. 3 is a flow chart depicting steps for establishing an original image conversion lookup table in present disclosure.

Please refer to FIG. 3, which is a flow chart depicting steps for establishing an original image conversion lookup table in present disclosure. The establishing of an original image conversion lookup table 200 comprises the following steps:

step 202: the plural cameras 40 are enabled to capture the calibration pattern 20 and the patterned features 30 and register the captured pattern features 30 into a memory 30 for obtaining an original image; whereas the original image is transmitted to the image processing interface 51 for processing;

step 204: the computing core 52 is enabled to perform an image distortion calibration process upon the original image for generating an original image distortion calibration parameter;

step 206: the computing core 52 is enabled to perform a bird-eye view conversion process upon the original image for generating an original image bird-eye view conversion parameter;

step 208: the computing core 52 is enabled to perform an image alignment process upon the original image for generating an original image alignment parameter;

step 210: the computing core 52 is enabled to perform a weight computing process of image stitching for generating a weighting parameter of image stitching; and step 212: the computing core 52 is enabled to perform a calculation for obtaining an original image conversion lookup table according to the original image distortion calibration parameter, the original image bird-eye view conversion parameter, the original image alignment parameter and the weighting parameter of image stitching, while storing the weighting parameter of image stitching in the memory unit 53, and the original image conversion lookup table is an around view monitoring (AVM) image conversion lookup table, whereas the conversion lookup table is the coordinate reference of the plural cameras 40.

In addition, during the establishing of an original image conversion lookup table 200, the vehicle 10 must remain static for allowing the calibration pattern 20 to be paved and placed on the floor surrounding the vehicle 10.

As shown in FIG. 1 and FIG. 2, the step 106 is enabled after step 104. At step 106, the plural cameras 40 are enabled to capture the patterned features 30 and register the captured patterned features 30 into the memory 53 after a period of time so as to obtain a correction image, while transmitting the correction image to the image processing interface 51 for processing.

It is noted that at step 106, only the patterned features 30 are captured, but not the calibration pattern 20. Therefore, since the patterned features 30 are disposed on and integrate into the vehicle 10, the step 106 can be performed either when the vehicle 10 is static or is moving. Moreover, since there is no need to capture the calibration pattern 20, neither the time consuming task for placing the calibration pattern 20 on the floor surrounding the vehicle 10 is required to be proceeded, nor the space is required for placing the calibration pattern 20. That is, the step 106 can be performed at any time and space without any limitation. Moreover, the period of time that is mentioned in step 106 can be set at will without limitation, and can be set manually or can be programmed to be enabled automatically.

Figure 4:
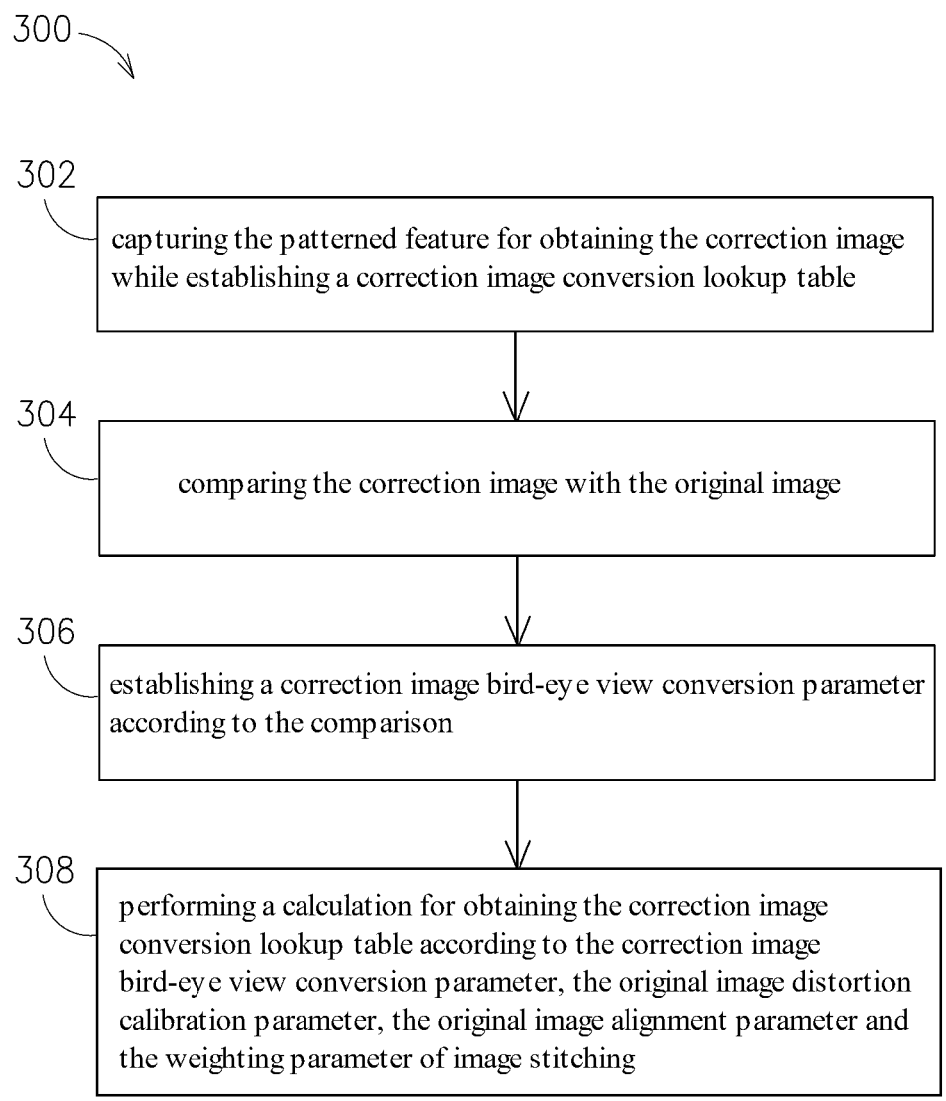
FIG. 4 is a flow chart depicting steps for establishing a calibration image conversion lookup table in present disclosure.

At step 106, the correction image is compared with original image for generating a comparison result to be used in a panorama image calibration process by recombining the images shoot by the plural cameras. Please refer to FIG. 4, which is a flow chart depicting steps for establishing a calibration image conversion lookup table in present disclosure. As shown in FIG. 4, the establishing of a correction image conversion lookup table 300 comprises the following steps:

step 302: the plural cameras 40 are enabled to capture the patterned features 30 and register the captured patterned features 30 into the memory 53 for obtaining a correction image; whereas the correction image is transmitted to the image processing interface 51 for processing;

step 304: the computing core 52 is enabled to compare the correction image with the original image; and in a condition when any of the cameras 40 is moved and displaced, there will be a corrosion portion shown in the correction image, whereas the corrosion portion is the portion of discontinuity for damaging the completion of the desired 360-degree around view image of the vehicle 10, and the displacement of the cameras 40 can be caused by vehicle collision or vibration;

step 306: the computing core 52 is enabled to establish a correction image bird-eye view conversion parameter according to the comparison; and step 308: the computing core 52 is enabled to perform a calculation for obtaining the correction image conversion lookup table according to the correction image bird-eye view conversion parameter of step 306, the original image distortion calibration parameter of step 204, the original image alignment parameter of step 206 and the weighting parameter of image stitching of step 208, while storing the correction image conversion lookup table in the memory unit 53 for replacing the original image conversion lookup table to be used in the next calibration.

To sum up, by the use of the method for adjusting a vehicle panorama system that is provided in the present disclosure, an original image including patterned features of a vehicle is registered initially, and thereby when there is any error in the panorama system mounted on the vehicle that is caused by the displacement of the cameras, the erroneous image can be compared with the original image for enabled a calibration process upon the vehicle panorama system without having to move the vehicle into a specific location where the calibration pattern is placed and available.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. Method for adjusting a vehicle panorama system, comprising the steps of:
    disposing a calibration pattern around a vehicle, while providing at least one patterned feature and a plurality of cameras to be disposed on the vehicle;
    capturing the calibration pattern and the at least one patterned feature so as to obtain an original image;
    capturing the at least one patterned feature and registering the captured patterned features into a memory after a period of time so as to obtain a correction image;
    comparing the correction image with original image for generating a comparison result to be used in a panorama image calibration process by recombining the images shoot by the plural cameras;
    capturing the calibration pattern and the patterned feature and registering the captured patterned features into the memory for obtaining the original image;
    performing an image distortion calibration process upon the original image for generating an original image distortion calibration parameter;
    performing a bird-eye view conversion process upon the original image for generating an original image bird-eye view conversion parameter;
    performing an image alignment process upon the original image for generating an original image alignment parameter;
    performing a weight computing process of image stitching for generating a weighting parameter of image stitching; and
    performing a calculation for obtaining the original image conversion lookup table according to the original image distortion calibration parameter, the original image bird-eye view conversion parameter, the original image alignment parameter and the weighting parameter of image stitching.

2. Method for adjusting a vehicle panorama system of claim 1, adapted to be performed by the use of an embedded device for enabling the establishing of original image conversion lookup table and the correction image conversion lookup table, wherein the embedded device comprises:
    an image processing interface, for processing the original image and the correction image;
    a computing core, for performing the image distortion calibration process, the bird-eye view conversion process, the image alignment process and the weight computing process of image stitching, and also the comparing of the original image and the correction image; and
    a memory unit, for storing the original image conversion lookup table or the correction image conversion lookup table.

3. Method for adjusting a vehicle panorama system of claim 2, wherein images of the calibration pattern and the patterned feature that are captured by the plural cameras are transmitted to the image processing interface to be processed.

4. Method for adjusting a vehicle panorama system of claim 1, further comprising the steps of:
    capturing the patterned feature and registering the captured patterned features into the memory for obtaining the correction image;
    comparing the correction image with the original image;
    establishing a correction image bird-eye view conversion parameter according to the comparison; and
    performing a calculation for obtaining the correction image conversion lookup table according to the correction image bird-eye view conversion parameter, the original image distortion calibration parameter, the original image alignment parameter and the weighting parameter of image stitching.

5. Method for adjusting a vehicle panorama system of claim 4, adapted to be performed by the use of an embedded device for enabling the establishing of original image conversion lookup table and the correction image conversion lookup table, wherein the embedded device comprises:
    an image processing interface, for processing the original image and the correction image;
    a computing core, for performing the image distortion calibration process, the bird-eye view conversion process, the image alignment process and the weight computing process of image stitching, and also the comparing of the original image and the correction image; and
    a memory unit, for storing the original image conversion lookup table or the correction image conversion lookup table.

6. Method for adjusting a vehicle panorama system of claim 5, wherein images of the calibration pattern and the patterned feature that are captured by the plural cameras are transmitted to the image processing interface to be processed.

7. Method for adjusting a vehicle panorama system of claim 1, wherein the patterned feature is a feature selected from the group consisting of: a vehicle sticker, an infrared pattern, a laser pattern, and a fluorescent pattern.

8. Method for adjusting a vehicle panorama system of claim 1, wherein each of the original image conversion lookup table and the correction image conversion lookup table is an around view monitoring (AVM) image conversion lookup table.

9. Method for adjusting a vehicle panorama system of claim 1, wherein during the performing of the capturing of the calibration pattern and the at least one patterned feature for obtaining the original image, the vehicle remains static.

10. Method for adjusting a vehicle panorama system of claim 1, wherein during the performing of the capturing of the at least one patterned feature for obtaining the correction image, the vehicle can be static or moving.

* * * * *